United States Patent
Fisher et al.

(10) Patent No.: US 7,441,108 B2
(45) Date of Patent: Oct. 21, 2008

(54) PORTABLE MEMORY DRIVE WITH PORTABLE APPLICATIONS AND CROSS-COMPUTER SYSTEM MANAGEMENT APPLICATION

(76) Inventors: Ken Scott Fisher, 5521 Cleon Ave., North Hollywood, CA (US) 91601; Kevin Cotton Baxter, 5521 Cleon Ave., North Hollywood, CA (US) 91601

( * ) Notice: Subject to any disclaimer, the term of this patent is extended or adjusted under 35 U.S.C. 154(b) by 675 days.

(21) Appl. No.: 10/224,746

(22) Filed: Nov. 19, 2002

(65) Prior Publication Data
US 2004/0095382 A1    May 20, 2004

(51) Int. Cl.
*G06F 9/40* (2006.01)
(52) U.S. Cl. .................. 712/227; 713/100
(58) Field of Classification Search ......... 709/200–250; 715/804, 750; 719/330; 710/306, 104, 300, 710/33, 63, 260, 302; 707/100; 712/227; 711/115; 713/1, 100, 2
See application file for complete search history.

(56) References Cited

U.S. PATENT DOCUMENTS

| | | | |
|---|---|---|---|
| 6,374,328 B1 | 4/2002 | Rhinehart | 711/115 |
| 6,400,471 B1* | 6/2002 | Kuo et al. | 358/468 |
| 6,408,351 B1* | 6/2002 | Hamdi et al. | 710/63 |
| 6,450,411 B1* | 9/2002 | Rash et al. | 236/44 A |
| 6,529,992 B1 | 3/2003 | Thomas | |
| 6,601,139 B1 | 7/2003 | Suzuki | |
| 6,658,515 B1* | 12/2003 | Larson et al. | 710/260 |
| 6,678,535 B1* | 1/2004 | Narayanaswami | 455/557 |
| 6,704,824 B1* | 3/2004 | Goodman | 710/300 |
| 6,711,647 B1* | 3/2004 | Holehan | 710/306 |
| 6,718,463 B1 | 4/2004 | Malik | |
| 6,721,332 B1* | 4/2004 | McAlear | 370/466 |
| 6,754,811 B1* | 6/2004 | Cato et al. | 712/227 |
| 6,757,783 B2* | 6/2004 | Koh | 711/115 |
| 6,772,252 B1* | 8/2004 | Eichler et al. | 710/104 |
| 6,832,271 B1* | 12/2004 | Ivan et al. | 710/15 |
| 6,850,257 B1* | 2/2005 | Colleran et al. | 715/804 |
| 6,862,643 B2* | 3/2005 | Wu et al. | 710/302 |
| 6,871,346 B1* | 3/2005 | Kumbalimutt et al. | 718/104 |
| 6,874,152 B2* | 3/2005 | Vermeire et al. | 719/330 |
| 6,880,130 B2* | 4/2005 | Makowski et al. | 715/763 |
| 6,895,499 B1* | 5/2005 | Frazier | 713/1 |

(Continued)

OTHER PUBLICATIONS

Object-oriented design methodology applied to the modeling of USB device and bus interface layers Caldari, M.; Conti, M.; Crippa, P.; Orcioni, S.; Sbrega, M.; Turchetti, C.; Circuits and Systems, 2002. ISCAS 2002. IEEE International Symposium on vol. 2, May 26-29, 2002 pp. II-368-II-371 vol. 2.*

(Continued)

*Primary Examiner*—Thong H Vu
(74) *Attorney, Agent, or Firm*—Irell & Manella LLP

(57) ABSTRACT

A system and method for transporting the look, feel, and function of one's personalized computer preferences across multiple host computers, including the appearance, settings, programs, and user data. This system and method uses a portable memory device and a data management system that maintains a consistent interface and data file structure on multiple host computers, including a common visual desktop interface. The portable memory solution also provides mobile access to the user's applications and personal data files. The memory device is capable of being connected to multiple host computers via a standard interface such as a USB port.

114 Claims, 1 Drawing Sheet

U.S. PATENT DOCUMENTS

Figure 1:
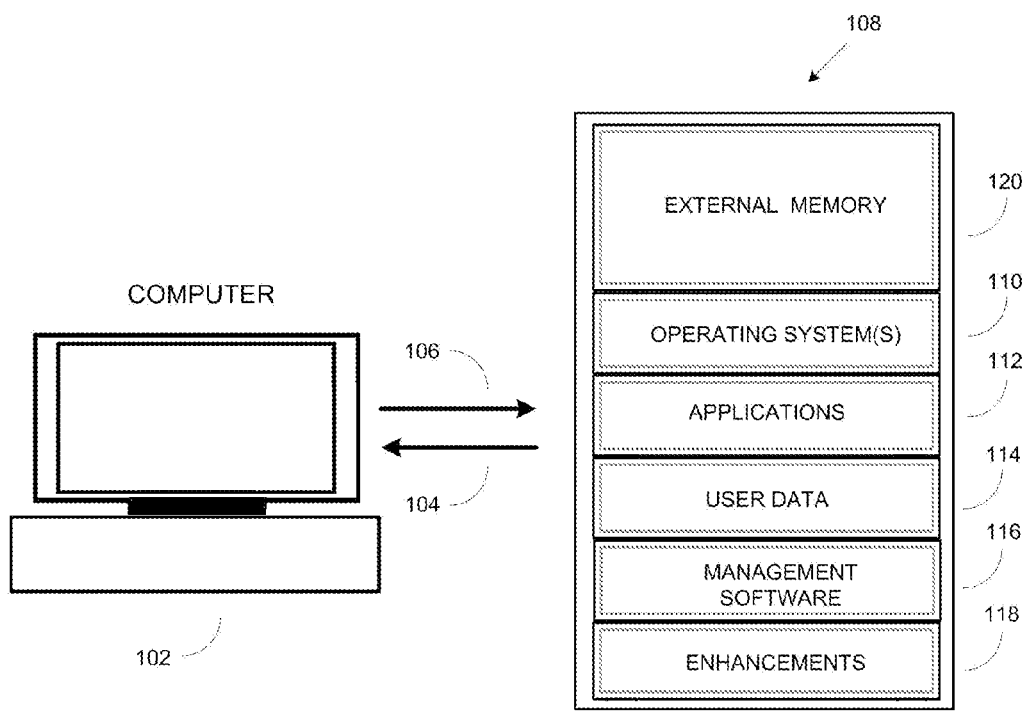

| | | | |
|---|---|---|---|
| 6,915,327 B1 * | 7/2005 | Tuli | 709/203 |
| 6,936,936 B2 * | 8/2005 | Fischer et al. | 307/151 |
| 6,947,995 B2 * | 9/2005 | Chang et al. | 709/231 |
| 6,996,708 B1 * | 2/2006 | Belknap | 713/2 |
| 7,006,881 B1 * | 2/2006 | Hoffberg et al. | 700/83 |
| 7,069,373 B2 * | 6/2006 | Teng | 710/310 |
| 7,111,086 B1 * | 9/2006 | Ecoleston et al. | 710/33 |
| 7,114,126 B2 * | 9/2006 | Berger et al. | 715/750 |
| 7,127,477 B2 * | 10/2006 | Duncombe et al. | 707/203 |
| 7,127,678 B2 * | 10/2006 | Bhesania et al. | 715/744 |
| 7,149,730 B2 * | 12/2006 | Mullins et al. | 707/2 |
| 2001/0054128 A1 | 12/2001 | Sezaki et al. | |
| 2002/0049887 A1 | 4/2002 | Takahashi | |
| 2002/0143921 A1 * | 10/2002 | Stephan | 709/223 |
| 2002/0145632 A1 | 10/2002 | Shmueli et al. | |
| 2002/0147912 A1 | 10/2002 | Shmueli et al. | |
| 2002/0188467 A1 * | 12/2002 | Eke | 705/2 |
| 2003/0038835 A1 * | 2/2003 | DeFelice | 345/738 |
| 2003/0046380 A1 * | 3/2003 | Steger et al. | 709/223 |
| 2003/0056036 A1 * | 3/2003 | Carlton | 710/15 |
| 2003/0110371 A1 * | 6/2003 | Yang et al. | 713/100 |
| 2003/0115415 A1 | 6/2003 | Want et al. | 711/115 |
| 2003/0167345 A1 * | 9/2003 | Knight et al. | 709/249 |
| 2003/0236821 A1 * | 12/2003 | Jiau | 709/203 |
| 2004/0019778 A1 | 1/2004 | Gere | |
| 2006/0031237 A1 * | 2/2006 | DeAnna et al. | 707/100 |

OTHER PUBLICATIONS

Universal serial bus implementation in an integrated access chip for ISDN systems Cruickshank, H.; Sun, Z.; Fan, Z.; Communications, IEE Proceedings-vol. 148, Issue 4, Aug. 2001 pp. 207-211.*

Novel output buffer design for Universal Serial Bus applications Hwang-Cherng Chow; Chen-Yi Huang; ASICs, 2000. AP-ASIC 2000. Proceedings of the Second IEEE Asia Pacific Conference on Aug. 28-30, 2000 pp. 69-72.*

Handheld haptics: a USB media controller with force sensing MacLean, K.E.; Shaver, M.J.; Pai, D.K.; Haptic Interfaces for Virtual Environment and Teleoperator Systems, 2002. Haptics 2002. Proceedings, 10th Symposium on Mar. 24-25, 2002 pp. 311-318.*

Design and features of an intelligent PC-based DAB receiver Nathan, D.; Sputh, B.; Faust, O.; Chua Beng Koon; Consumer Electronics, IEEE Transactions on vol. 48, Issue 2, May 2002 pp. 322-328.*

Real-time decoding and streaming of DAB audio frames by a user-space program running on a non-real-time OS Nathan, D.; Sputh, B.; Faust, O.; Chua Beng Koon; Consumer Electronics, IEEE Transactions on vol. 48, Issue 2, May 2002 pp. 313-321.*

Integrating communication protocol selection with hardware/software codesign Knudsen, P.V.; Madsen, J.; Computer-Aided Design of Integrated Circuits and Systems, IEEE Transactions on vol. 18, Issue 8, Aug. 1999 pp. 1077-1095.*

Performance enhancement of multistage interconnection networks with unit step buffering Hee Young Youn; Hyunseung Choo; Communications, IEEE Transactions on vol. 47, Issue 4, Apr. 1999 pp. 618-630.*

Jon Halpin Zip Up Your Apps PC Magazine Review Date: Jun. 19, 2001—printed from www.pcmag.com on Feb. 28, 2006 (2 pages).

Integrated Digital Systems Edge XP Active Disk product data sheet, copyright 2002-2004. Downloaded from www.edgepot.com on Feb. 28, 2006 (2 pages).

* cited by examiner

PORTABLE MEMORY DRIVE WITH PORTABLE APPLICATIONS AND CROSS-COMPUTER SYSTEM MANAGEMENT APPLICATION

BACKGROUND

1) COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the data as described below and in the drawing hereto: ® COPYRIGHT 2002, The Fisher Group, All Rights Reserved.

2) TECHNICAL FIELD OF THE INVENTION

The present invention pertains generally to the storage of digital data, and more particularly to a method and apparatus for the consistent presentation and functionality of the user interface across multiple computer systems.

3) BACKGROUND OF THE INVENTION

The increasing use of multiple computers, by single individuals has revealed various problems with software applications, managing user-data, and navigating multiple user interfaces. For example, a user may work on a project on a computer at one location, and then need to take the work data to a second location. The computer at the second location may or may not, have the same applications available. If the computer at the second location has similar applications, there still may exist system incompatibilities, such as different versions of same software, missing conversion drivers (e.g., Word Perfect to Microsoft Word converters) or missing DLL files. Even if such a system has all the necessary applications, updates and drivers, it only provides software and related services, without considering the user's requirements or preferences. As a result, the system is not optimized for the user's specific needs, ease of use and/or preferences.

One such solution is a portable computer (e.g., laptop), wherein the laptop computer itself is transported from one location to another. Again, there may be compatibility issues, such as interfacing with local printers, LAN adapters, web portal access means, etc. There are also size and weight issues, wherein a much smaller data transportation device would be more advantageous. One notable feature designed primarily for laptops is their ability to suspend their current state, so-as to resume at a later time, in the exact same state and position. This so called 'hibernation' mode (also called suspend-to-disk), typically stores the computer's current RAM and video RAM data to disk. When the computer is restarted, the stored hibernation file is reloaded and all programs and documents that were open when the computer turned off are restored on the desktop.

Another commonplace solution is to use two computers, one for the desktop, and a laptop for traveling. This has created a problem wherein when a business executive returns to the office, the laptop computer used in the field may now have more recent data than the office based computer. Also, when the business executive leaves to go on a trip, the portable may be behind the desktop computer. This results in a problem of trying to know just which computer has the most current data files. In addition, the laptop and desktop computers (owned by the same individual) may also have file incompatibility issues. Sync options are available, but generally one could spend a good deal of time just tending to all the software and hardware to connect, sync and disconnect multiple computers, and one is never assured that all of the most current files, are in the correct location.

Unified interfaces have also been proposed and implemented utilizing the Internet or direct telephone access, where one's programs and data reside on remote servers, usually accessed via broadband web connections. One such embodiment is a remote access terminal system. In such a system, only the keyboard, monitor and mouse control of one computer system is typically used to remotely control a server at a second location (e.g., over a direct telephone or Internet connection). Such systems are more complex than what will be described herein, and it should also be noted that there simply exists times and places in the world where workable data connections to remote servers are either non-existent, or not practical (not to mention the associated costs). Privacy and security issues also abound.

In should also be noted that with the advent of e-mail, data management problems have only compounded: is the most current file located on web-based server? Is the file located in the temporary web download folder of the then current host computer? What about file security?

All of this points to lost time and efficiencies, security risks, and the real potential of not having immediate access to one's data, or the possibility of working on the incorrect version of the data file.

In the past, if a computer user wanted to be assured of using the same user interface, applications and data files on multiple computers, the user would literally have to transport a "bootable" hard drive from one computer to another. This of course required cabling, connecters and installation on the second system. This, in general, was not a very workable and portable approach, and also required that the drive be bootable, in order to retain such features.

Books such as Microsoft® Windows® User Experience, Microsoft Corporation, ISBN: 0-7356-0566-1, Release: Sep. 8, 1999, shows visual editing methods, programming and also details the official Microsoft® guidelines for creating well-designed, visually and functionally consistent user interfaces for applications that run on the Microsoft Windows® family of operating systems, including Windows 98 and Windows 2000. This reference source is incorporated herein by reference, in its entirety, including the chapters related to designing software so as to integrate with multiple Windows-based computer systems.

The world is now moving quickly towards truly "standard" interfaces (e.g., USB 1.1, 2.0, Firewire), which are available on many systems and platforms (e.g., Apple, PC-compatible). These new unified standards, which when properly applied, will provide considerably more options to system designers and computer programmers, so as to help eliminate the multiple problems noted above.

Flash memory is used in many devices, including video cameras, digital cameras, laptop computers, portable digital assistance devices, portable video games, portable language translators, handheld scanners, and other devices. With some host devices, the flash memory is embedded within the device itself, and others, such as portable USB flash drives, are external to the device. These ultra portable devices (e.g., flash drives, micro drives) are commonly the size of a pack of gum, and have achieved the status of "pocketability" (e.g., easily fits in one's pocket).

With such portable flash drives; a user may easily move data files from one computer to another. This is especially true with Windows Millennium edition and higher operating systems, where devices such as USB flash drives can be used in a "plug and play" fashion (without the need for any external drivers). Earlier operating systems can also benefit by the addition of adding a once-installed external driver. Such devices are ideally suited for the transportation of information, since they have no moving parts (e.g., more rugged than conventional micro drives), and are usually powered directly from the USB port (no external power or batteries). It should be noted that these devices currently make no effort to optimize a user's specific needs or preferences.

USB is of course well known in the art, and today, USB is enjoying tremendous success in the marketplace, with most peripheral vendors around the globe developing products to this specification. Virtually all new personal computers come with one or more USB ports on the box. In fact, USB has become a key enabler of the Easy PC Initiative, an industry initiative led by Intel and Microsoft to make PCs easier to use. This effort sprung from the recognition that users need simpler, easier to use PCs that don't sacrifice connectivity or expandability. USB is one of the key technologies used to provide this. Newer Apple computers systems conveniently locate a USB port on the side of the keyboard. The invention as described herein, aims to further extend this simpler, easier to use personal computer concept.

A cursory understanding of multi-user computer systems may be helpful in better defining the invention described herein. Most modem operating systems provide a multi-user environment, which means it can support numerous users, each with unique settings. A user profile is the collection of user-specific settings that define the desktop and operational environment for a particular user, including such information as start menu layout, desktop layout and icons, file view preferences, and various user configuration data files.

Users can normally customize their profiles so that any changes made during a logon session are recorded on that specific computer and used again during the next session, when the user returns to the same machine. User profiles can also be mandatory. A mandatory profile is one in which user changes are not saved. Alternatively, a network administrator can implement "roaming profiles" that follow users from one workstation to another, letting users maintain their operational environment even if their physical location changes on the network. If there's a problem with a desktop system, a user can move to another PC on the network and access their unique configuration. This allows users to access their familiar desktop and all their files while connected to the system.

Heretofore, a barrier has essentially existed for users who wish to retain the same look, "feel", and functionality as they move between multiple "non-connected" host computer systems. There would be remarkable advantages in portability, efficiencies and ease of use, if the user-defined interfaces, preferences, configuration data, software applications, data files and the like were located on an ultra-small portable memory drive that could fit on end your key chain.

As a result, a need exists in the art for a method and apparatus that provides the user with the same look, feel and operating characteristics of their "personalized" computer, across multiple computer systems (without the need for directly connecting the multiple systems). A further need exists in the art for a method and apparatus that provides a portable memory device capable of configuring multiple host computers to run software (and operating systems) located on the small extremely portable memory device. There is a further need for an improved method and apparatus that provides increased security in data transportation without being required to be connected to the Internet or otherwise expose confidential data to multiple host computers. A still further need exists for a method and apparatus that provides a flash memory solution for a host device that is capable of transmitting data via a wireless means to a host computer, thereby allowing further ease of use.

A primary object of the present invention is to provide a new, novel and useful method and apparatus, which is extremely portable and does not require the portable memory device to be bootable to maintain a consistent user interface, application access or data structure.

A further object of the present invention is to provide a method and apparatus as characterized above in which the user is provided with a data solution that stores the current state of one's machine, and is then capable of re-creating the same state on a different host computer, or the same computer at later date.

A further object of the present invention is to provide an improved method and device for users who work on multiple platforms (e.g., PC and Apple).

A further object of the present invention is to provide an improved method and device as characterized above which by its nature is more intuitive to use and thereby enhances the user's efficiency.

4) SUMMARY OF THE INVENTION

An integrated computer management and storage system comprising: a portable memory device; and data management software. By way of example, and not limitation, the management software provides the user with similar desktop visual depictions and system functions (e.g., customized desktop, custom control panel functions, icons, paths and drive nomenclature) across multiple host computers. This may include standardized access to user data, user preferences, file system structure, and other unified operational features.

The portable memory device and management software is integrated with a host microcomputer, via an industry standard interface (e.g., USB port, Firewire port, and/or wireless means, such as Bluetooth, or Ultra-Wideband). The inventive system combines software and hardware into an integrated system with significant performance enhancements over prior art approaches.

In a preferred embodiment, the portable memory storage device may also include common software applications (e.g., word processing, spreadsheet, etc.). This option of including application software further provides for an improved mobile data system. In one embodiment, the system is bundled with software applications configured to run on multiple computer systems. This allows the user to have access to such programs, even if they are not permanently installed on a host computer.

Any of the embodiments may have one or more "save this as a preferred interface" buttons, so as to save one or more default "preferred" setups, such that can be restored in the same state on future sessions. The button itself may be configured in software (e.g. part of the management software) or as a hardware button on the inventive device.

In another embodiment, the system includes a hibernation feature, which allows the user to save the state of the computer "as-is", e.g., by writing the host's computer RAM and settings into the portable memory devices. Such a hibernation feature is well known, and can be accomplished by one skilled in the art. Such a system allows faster restarts and, generally provides simpler usage, whereby one's common applications may always be open, and wherein one is able to pick up at the same point that one left off at, on the previous session (without having to manually restart each application and data file).

Attention needs to be paid to the real world, wherein ease of use is critical, the inventive system allows a user to move simply from one computer, to another, while at all times keeping their 'personalized' computer, and optionally letting them resume (e.g., hibernate feature) at the same exact point from a previous session. Great strides have been made to simplify user interfaces in the last several years, yet many people still struggle with computers. With the inventive system, operating a computer as stated herein would of course be much more simplified, but even more important, the operating mechanics of the computer itself would be much more transparent to the user, and thereby greatly aiding in ease of use.

Such a system can also provide increased security by containing the user's data files to a personal portable data storage solution. Data encryption, data backup schemes and password protection systems are well known in the art, and may also be included in the inventive device.

The invention is distinguished over the known prior art in a multiplicity of ways. For one thing, the invention allows the user the opportunity to initiate work, or discontinue work at their own whim as a function of time over a series of sessions on single or multiple computers, including the ability to retain the same user interface. Equally as important, however, is the ability to provide the user with the ability to resume at the same exact point on a future session on a different host computer.

In one embodiment, the portable memory device further includes a 2-way wireless (e.g., infrared, radio frequency ("RF") transceiver, including Bluetooth, and other wireless means). In such a preferred embodiment, such a RF interface may be incorporated within the memory device so as to allow it to communicate electronically via wireless means. As a result, data can be transferred to and from the memory device to a host computer without the need for direct physical connection. In one embodiment, the inventive device further comprises a mechanism, such as a micro-switch, that allows a user to initiate a wireless data transmission to the host computer. Additionally, a visual display mechanism can be provided on the memory device to show the current state of connection and data transmission. These wireless interface schemes are of course well known in the art, and as such, do not merit an in-depth discussion herein.

In yet another embodiment, the portable solution may also include an operating system (e.g., Windows, Mac OS, Linux, UNIX, etc.). It is commonplace now to have the ability to boot a computer into different operating systems. Such bootable external drives are well known in the art (e.g., floppy, CD, single hard drives) and can be accomplished by one skilled in the art. An integrated memory solution that is ultra portable, pocketable, configured for individual users, which is also bootable, would be an extremely valuable addition to the art. This approach could also allow a whole new class of low-cost computer systems, e.g., systems without a full operating system (e.g., low-cost or "thin" terminals with access means to the inventive device). Such systems could be used in airports for travelers, or installed on airplanes (e.g., in the backs of aircraft passenger seats). A user could simply plug the device system into the low-cost terminal; the operating system of their choice could already be installed on the portable device, along with their applications, data files, and system preferences. This entire approach can be designed and optimized with each user's specific requirements, preferences, and thereby allow much greater ease of use over prior art approaches. In a related embodiment, the inventive system may have a full operating system, yet this would still allow for lower cost systems with similar capabilities as outlined above.

With regard to movement of the data files themselves, the inventive system could be moved cross-platform across by a common access means (e.g. via USB ports, wireless). Also, since emulation software is well known in the art (e.g., running PC software on an Apple platform), the inventive system could further provide cross-platform emulation capabilities.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

5) DESCRIPTION OF THE DRAWINGS

The present invention is illustrated by way of example and not by way of limitation in the figures of the accompanying drawings in which references indicate similar elements and in which:

FIG. 1 is a flow chart of the instrumentality and data flow according to the present invention.

6) DETAILED DESCRIPTION OF THE INVENTION

Before describing in detail the portable memory system in accordance with the present invention, it should be observed that the present invention resides primarily in what is effectively a novel combination of specific system management software and emerging memory circuits and components, and not in the particular detailed configurations thereof. Accordingly, the structure, control and arrangement of the software, circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring to FIG. 1 there is illustrated the system overview in accordance with the present invention. Computer 102 (only one exemplary computer is shown) which may include a connector port (not shown) such as USB or Firewire (or via other communications as stated herein) for communications with the portable memory device 108. In more detail, FIG. 1 also shows the bi-directional data flow to and from the memory device 108 and the computer 102, via communications 104 and 106. Besides USB or Firewire, such communications 104 and 106 may also consist of any industry standard communications means (e.g., direct physical connection, POMIA, Local Area Network (LAN), a Wide Area Network (VVAN), the Internet, a telecommunication network and wireless options such as cellular communication, infrared, Laser, radio frequency means (RF), Bluetooth, DSSS, Ultra Wideband, wireless LAN or WAN) or other connection means. Bi-directional communications 106 and 104, may include an antenna for the wireless embodiment, as is well known in the art.

When the portable external memory device 108 is in communication with host computer 102, management program 116 will initiate the re-mapping process so as to reconstruct the state of the personalized user interface (e.g., desktop icons, settings, background themes, and so on). Taking a simple example, wherein a user would prefer the desktop icons 50% larger. Management software 116 may be programmed to initiate the desired multi-system preference. In this non-limiting exemplary example, the user is currently on a host machine running the older Windows 98SE operating system (OS). Management software 116 senses the current OS through commonly practiced means, and may make a backup of the Registry files first (e.g., the System.dat and User.dat). System 116 is then programmed to edit the Registry by first navigating and opening the HKEY_CURRENT_USER\ControlPanel\Desktop\Window Metrics file. The Shell Icon Size is modified within the Edit String dialog box, by changing the number on the Value data line from the default 32 pixels icon size, to the desired size of 48 pixels. After finishing the editing on the file, management software 116 saves and closes the Registry file and refreshes the system so-as to show the changes. This and other system modifying approaches are common in the programming world, and may be used to further configure the system to produce the optimized user desktop and configuration management software 116. One normally skilled in the art can accomplish this. Interface style sheets (e.g. web HTML style sheets) are well known in the art, and may be used in helping to create the personalized graphical user interface of the inventive system.

Multi user profiles, Object Linking and Embedding (OLE), drive letter assignment schemes, and roaming profiles are also well known in the art, and as such may be used to help structure the interfacing of the inventive device 108 to a host computer 102. Since multi-user profiles are extremely common in most of today's operating systems, the inventive device may interface with the host computer's OS user profile system, so as to make it "appear" that the user's personal settings had already been a "pre-existing" profile on the host system. The management software 116 may be set so as to insure that the changes made to a host computer are temporary (e.g., "mimic" a mandatory user profile, restore the pre-existing state of host computer after usage). As stated earlier, roaming profiles (e.g., networked systems) are well known on connected computer systems, and may be adapted to non-connected use, as described herein by one normally skilled in the art, with the benefit of the disclosure described herein. Object Linking and Embedding with dynamically updated links may also be used to quickly establish links between host computer 102 and portable memory solution 108.

Management software 116 may further include a hibernation feature, such a program, which on execution will save the state of computer 102 and then will write this information along with selected information (e.g., ram, video ram, programs and registry information, preferences, settings, etc.) to memory device 108. Such hibernation features are well known in the art, and the integration in the inventive device can be accomplished by one skilled in the art.

By way of non-limiting example, a business executive could work on a data file at the office, then unplug the ultra small (e.g., 81 mm×23 mm×12.5 mm) and virtually weightless (e.g. 17 g) memory device system 108 from his office computer 102, then proceed to plug the system into his home computer 102 (only one exemplary computer is shown) to continue working (picking up exactly where they left off, with the optional hibernate feature). The following morning, he or she could seamlessly continue to work on their laptop computer 102 on their flight to London. Once at the hotel, the executive could easily plug the system into a computer 102 located in the hotel's business center, and print out the finished report on the local printer. Across all the computers, the user has enjoyed the same interface, and optionally had access to their applications 112 (e.g., stored on the memory device). The management software 116 may also be programmed to sense the monitor configuration on the host device, and adjust accordingly (e.g., resize the display, resize the saved desktop data), so-as to present the data in a close representation of the preferred user-defined custom interface. It should be noted that most newer systems are using a 430 mm (17 in.) monitor.

Referring again to the executive's home computer 102; both of the executive's teenage children may each have their own memory storage system 108. Each system could be configured for their own individual usage (e.g., applications 112, graphical interface, games, etc.), with the teenagers easily moving their data and user preferences from the home computer 102, to computers 102 located in the school lab, to computers 102 located at an internet café, while at all time maintaining the same look, feel and functionality as if they were using only using a single computer, at a single location. Even the embodiment without the bundled software applications (excluding 112) would be extremely valuable in keeping one's information organized as one moved to different host computers.

Regarding the memory device 108 itself, it may be a memory card, a memory cartridge, a floppy disk, a removable hard disk, a flash memory drive, flash drive card, PCMIA memory card, a micro-drive, or the like.

Further enhancements envisioned to the memory device 108 may include an integrated microprocessor 118, a display 118, a real time clock 118, a solar cell 118 and/or a battery 118 for providing power to the device, data entry means 118, alert system 118, barcode identifier 118 and/or scanner 118, parasitic RF identification interface 118 (e.g., such as Mobil's Speed Pass), storage for personal data and credit card and/or banking information 114, personal identification 114, a flashlight 118, a sound generating device 118, an electronic voice recorder 118, a writing device 118, fingerprint 118 and/or iris acquisition scanner 118, and as a music (e.g., MP3) jukebox 114 with appropriate software 112. These foregoing enhancements could be integrated with the memory device 108, either on their own, or in any combination, and for example providing access means to doors—(e.g., direct key connect or by wireless means), automobiles (e.g., access, alarm enable or disable), buildings and the like. The combined system may also enable features such as: purchase payment means, tracking device (with integrated mini-GPS system 118), feature, identification means, illumination, traveling directions, emergency alert system, medical alert and information, dictating, writing, jukebox, time of day, reminder (e.g., programmed alarms). All such features are now commonplace and could be accomplished by one skilled in the art. Such options may or may not include some of the base components of the memory solution 108 (e.g., 110, 112, 114, 116, and so on), as outlined herein.

While the present invention has been described with reference to specific exemplary embodiments, it will be apparent to those skilled in the art that various modifications and changes may be made to these embodiments without departing from the broader spirit and scope of the invention as set forth in the claims. Since modifications of the disclosed embodiments incorporating the spirit and substance of the invention may occur to persons skilled in the art, the invention should be construed to include everything within the scope of the appended claims and equivalents thereof. Accordingly, the specification and drawings are to be regarded in an illustrative rather than restrictive sense.

What is claimed is:

1. A method for configuring multiple host computers to launch and run mobile software applications stored on a portable USB non-volatile solid-state memory device, said method comprising:
    a. providing a plurality of mobile user applications on a transportable USB non-volatile solid-state memory device, said mobile user applications configurable for portable operation across multiple host computers such that the mobile user applications are operable when the transportable USB non-volatile solid-state memory device is physically coupled to one of the multiple host computers;
    b. providing a system management application on said transportable USB non-volatile solid-state memory device, said system management application configured to enable a temporary user session including execution of said mobile user applications on a host computer without permanent installation of said mobile user applications or a reboot being required when the transportable USB non-volatile solid-state memory device is initially coupled to the host computer for the first time, wherein said mobile user applications are no longer available on said host computer when the transportable USB non-volatile solid-state memory device is removed from the host computer, thus resulting in the temporary user session; and
    c. providing program shortcuts or icons representative of the mobile user applications viewable across the multiple host computers, said program shortcuts or icons configured to launch the mobile user applications upon selection by a user on the host computer, wherein the system management application is configured to present the program shortcuts or icons in a consistent user interface viewable across the multiple host computers based upon configuration data or user preferences stored and transported on the transportable USB non-volatile solid-state memory device;
    d. wherein the system management application facilitates the configuration of the multiple host computers to run the mobile user applications by remapping file associations between the program shortcuts or icons and the mobile user applications when the transportable USB non-volatile solid-state memory device is decoupled from one of the multiple host computers and coupled to another one of the multiple host computers; and
    e. wherein the system management application further provides a standardized file system structure such that the remapping of file associations is carried out according to the standardized file system structure, whereby the program shortcuts or icons utilize a consistent path name to launch one or more program files associated with the mobile user applications across the multiple host computers, said consistent path name being stored and transported on the transportable USB non-volatile solid-state memory device.

2. The method of claim 1, wherein said file associations comprise a path name to the mobile user applications.

3. The method of claim 2, wherein said path name further comprises a drive nomenclature identifying the transportable USB non-volatile solid-state memory device.

4. The method of claim 1, further comprising the step of storing user data files on said transportable USB non-volatile solid-state memory device, and wherein said user data files are movable across the multiple host computers.

5. The method of claim 4, wherein the system management application further provides a standardized file system structure, such that a consistent path name is utilized to access the user data files on said transportable USB non-volatile solid-state memory device across the multiple host computers.

6. The method of claim 5, wherein said path name further comprises a drive nomenclature identifying the transportable USB non-volatile solid-state memory device.

7. The method of claim 4, wherein the system management application further provides a standardized file system structure based upon folder or directory structure information stored and transported on the transportable USB non-volatile solid-state memory device, such that a consistent path name is utilized to access a given folder or directory on said transportable USB non-volatile solid-state memory device across the multiple host computers.

8. The method of claim 1, wherein the system management application is configured to provide standardized access to the transportable USB non-volatile solid-state memory device based upon configuration data or user preferences stored and transported on the transportable USB non-volatile solid-state memory device, wherein said standardized access permits utilization of a consistent drive nomenclature or consistent device path name to access the transportable USB non-volatile solid-state memory device across the multiple host computers.

9. The method of claim 1, wherein said program shortcuts or icons comprise OLE links and/or OLE embedded objects loaded from the transportable USB non-volatile solid-state memory device to the host computer.

10. The method of claim 9, wherein said OLE links or OLE embedded objects are dynamically updated or remapped on the new host computer when the transportable USB non-volatile solid-state memory device is decoupled from one of the multiple host computers and coupled to another one of the multiple host computers.

11. The method of claim 1, wherein said file associations are dynamically updated or remapped on the new host computer when the transportable USB non-volatile solid-state memory device is decoupled from one of the multiple host computers and coupled to another one of the multiple host computers.

12. The method of claim 1, wherein said consistent user interface comprises a start menu on a Windows® based operating system.

13. The method of claim 1, further comprising a mobile user profile stored on the transportable USB non-volatile solid-state memory device, wherein said system management application is configured to interface the mobile user profile with the host computer user profile system thereby causing the host computer to utilize settings and/or configurations provided by the mobile user profile.

14. The method of claim 1, wherein said mobile user applications comprise common software applications including at least a word processing application and/or a spreadsheet application.

15. The method of claim 1, wherein said mobile user applications comprise common software applications including one or more of the following: (1) an e-mail client application; (ii) a web browser application; (iii) a game application; and (iv) an anti virus application.

16. The method of claim 1, wherein said system management application is further configured to adapt graphics display settings or data display settings on the host computer in order to compensate for different monitor characteristics encountered when the transportable USB non-volatile solid-state memory device is moved between the multiple host computers, based upon user-preferred graphics display settings or data display settings stored and transported on the transportable USB non-volatile solid-state memory device.

17. The method of claim 1, further comprising the step of storing program settings relating to the mobile user applications on said transportable USB non-volatile solid-state memory device, and wherein said program settings are movable across the multiple host computers and utilized by the system management application to configure the mobile user applications when executed on any of the multiple host computers to which the transportable USB non-volatile solid-state memory device is currently physically coupled.

18. The method of claim 17, wherein said program settings relating to the mobile user applications comprise one or more of the following: (i) the path to the mobile user applications; (ii) website links; (iii) program configuration settings; (iv) operating system registry items; (v) application DLL files; and (vi) host computer configuration data.

19. The method of claim 1, further comprising the step of storing user settings or user preferences relating to a graphical user environment and/or to the mobile user applications on said transportable USB non-volatile solid-state memory device, and wherein said user settings or user preferences are movable across the multiple host computers when the transportable USB non-volatile solid-state memory device is moved between the multiple host computers.

20. The method of claim 1, further comprising the step of providing a security feature, said security feature comprising a password protection system including a password stored and transported on the transportable USB non-volatile solid-state memory device to restrict access to data stored on the transportable USB non-volatile solid-state memory device.

21. The method of claim 1, wherein said transportable USB non-volatile solid-state memory device and the mobile user applications stored thereon are enabled on the host computer without the need for any external drivers and are instead enabled via a plug and play connection protocol.

22. The method of claim 1, wherein said plurality of mobile user applications can be run on the host computer at the same time.

23. The method of claim 1, wherein said consistent user interface is modifiable or updateable, such that modified or updated user preferences or configuration data are stored and transported on the transportable USB non-volatile solid-state memory device.

24. The method of claim 1, wherein said consistent user interface is presented in a user selectable menu configuration.

25. The method of claim 1, wherein the system management application is enabled without the need for a bootable operating system on the transportable USB non-volatile solid-state memory device.

26. The method of claim 1, wherein the mobile user applications are operable on the host computer without the need for a microprocessor on the transportable USB non-volatile solid-state memory device to execute instructions of the mobile user applications.

27. The method of claim 26, wherein the system management application is configured to facilitate running the mobile user applications on a processor of the host computer and does not provide running of the mobile user applications on any processor that resides on the transportable USB non-volatile solid-state memory device.

28. The method of claim 1, wherein said transportable USB non-volatile solid-state memory device does not include a processor configured to run the mobile user applications.

29. The method of claim 1, wherein said transportable USB non-volatile solid-state memory device is a USB flash memory device.

30. The method of claim 1, wherein the system management application is configured to facilitate running the mobile user applications on an operating system of the host computer and does not provide running of the mobile user applications on any operating system that resides on the transportable USB non-volatile solid-state memory device 31. The method of claim 1, wherein the mobile user applications are configurable for portable operation across multiple host computers by being accessible to one of the host computers directly from the transportable USB non-volatile solid-state memory device without the need for network connectivity by the host computer in order to access the mobile user applications.

32. The method of claim 1, wherein said path name further comprises a drive nomenclature identifying the transportable USB non-volatile solid-state memory device.

33. The method of claim 1, wherein the system management application ensures that any user files created during the temporary user session and remaining on the host computer at the end of the temporary user session are deleted.

34. The method of claim 1, wherein the system management application further provides a standardized file system structure, wherein said standardized file system structure is configured to adapt to file system variables encountered when the transportable USB non-volatile solid-state memory device is moved between the multiple host computers by automatically remapping one or more paths to a file or folder located on the transportable USB non-volatile solid-state memory device.

35. A computer readable medium having stored thereon computer-executable instructions for configuring multiple host computers to launch and run mobile software applications stored on a transportable USB non-volatile solid-state memory device, by causing one or more processors to perform the steps of:

a. storing a plurality of mobile user applications on a transportable USB non-volatile solid-state memory device, said mobile user applications configurable for portable operation across multiple host computers such that the mobile user applications are operable when the transportable USB non-volatile solid-state memory device is physically coupled to one of the multiple host computers;

b. storing a system management application on said transportable USB non-volatile solid-state memory device, said system management application configured to enable a temporary user session including execution of said mobile user applications on a host computer without permanent installation of said mobile user applications or a reboot being required when the transportable USB non-volatile solid-state memory device is initially coupled to the host computer for the first time, wherein said mobile user applications are no longer available on said host computer when the transportable USB non-volatile solid-state memory device is removed from the host computer, thus resulting in the temporary user session; and c. providing program shortcuts or icons representative of the mobile user applications viewable across the multiple host computers, said program shortcuts or icons configured to launch the mobile user applications upon selection by a user on the host computer, wherein the system management application is configured to present the program shortcuts or icons in a consistent user interface viewable across the multiple host computers based upon configuration data or user preferences stored and transported on the transportable USB non-volatile solid-state memory device;

d. wherein the system management application facilitates the configuration of the multiple host computers to run the mobile user applications by remapping file associations between the program shortcuts or icons and the mobile user applications when the transportable USB non-volatile solid-state memory device is decoupled from one of the multiple host computers and coupled to another one of the multiple host; and e. wherein the system management application further provides a standardized file system structure such that the remapping of file associations is carried out according to the standardized file system structure, whereby the program shortcuts or icons utilize a consistent oath name to launch one or more program files associated with the mobile user applications across the multiple host computers, said consistent path name being stored and transported on the transportable USB non-volatile solid-state memory device.

36. The computer readable medium of claim 35, wherein said file associations comprise a path name to the mobile user applications.

37. The computer readable medium of claim 36, wherein said path name further comprises a drive nomenclature identifying the transportable USB non-volatile solid-state memory device.

38. The computer readable medium of claim 35, wherein said computer-executable instructions further cause one or more processors to perform the step of storing user data files on said transportable USB non-volatile solid-state memory device, and wherein said user data files are movable across the multiple host computers.

39. The computer readable medium of claim 38, wherein the system management application further provides a standardized file system structure, such that a consistent path name is utilized to access the user data files on said transportable USB non-volatile solid-state memory device across the multiple host computers.

40. The computer readable medium of claim 39, wherein said path name further comprises a drive nomenclature identifying the transportable USB non-volatile solid-state memory device.

41. The computer readable medium of claim 38, wherein the system management application further provides a standardized file system structure based upon folder or directory structure information stored and transported on the transportable USB non-volatile solid-state memory device, such that a consistent path name is utilized to access a given folder or directory on said transportable USB non-volatile solid-state memory device across the multiple host computers.

42. The computer readable medium of claim 35, wherein the system management application is configured to provide standardized access to the transportable USB non-volatile solid-state memory device based upon configuration data or user preferences stored and transported on the transportable USB non-volatile solid-state memory device, wherein said standardized access permits utilization of a consistent drive nomenclature or consistent device path name to access the transportable USB non-volatile solid-state memory device across the multiple host computers.

43. The computer readable medium of claim 35, wherein said program shortcuts and/or icons comprise OLE links or OLE embedded objects loaded from the transportable USB non-volatile solid-state memory device to the host computer.

44. The computer readable medium of claim 43, wherein said OLE links or OLE embedded objects are dynamically updated or remapped on the new host computer when the transportable USB non-volatile solid-state memory device is decoupled from one of the multiple host computers and coupled to another one of the multiple host computers.

45. The computer readable medium of claim 35, wherein said file associations are dynamically updated or remapped when the transportable USB non-volatile solid-state memory device is moved between the multiple host computers.

46. The computer readable medium of claim 35, wherein said consistent user interface comprises a start menu on a Windows® based operating system.

47. The computer readable medium of claim 35, wherein said system management application is configured to provide or modify at least a portion of an operating system registry on the host computer in order to enable execution of said mobile user applications on the host computer.

48. The computer readable medium of claim 35, wherein said mobile user applications comprise common software applications including at least a word processing application and/or a spreadsheet application.

49. The computer readable medium of claim 35, wherein said mobile user applications comprise common software applications including one or more of the following: (1) an e-mail client application; (ii) a web browser application; (iii) a game application; and (iv) an anti virus application.

50. The computer readable medium of claim 35, wherein said computer-executable instructions further cause one or more processors to perform the step of adapting graphics display settings or data display settings on the host computer in order to compensate for different monitor characteristics encountered when the transportable USB non-volatile solid-state memory device is moved between the multiple host computers, based upon user-preferred graphics display settings or data display settings stored and transported on the transportable USB non-volatile solid-state memory device.

51. The computer readable medium of claim 35, wherein said computer-executable instructions further cause one or more processors to perform the step of storing program settings relating to the mobile user applications on said transportable USB non-volatile solid-state memory device, and wherein said program settings are movable across the multiple host computers and utilized by the system management application to configure the mobile user applications when executed on any of the multiple host computers to which the transportable USB non-volatile solid-state memory device is currently physically coupled.

52. The computer readable medium of claim 51, wherein said program settings relating to the mobile user applications comprise one or more of the following: (i) the path to the mobile user applications; (ii) website links; (iii) program configuration settings; and (iv) host computer configuration data.

53. The computer readable medium of claim 35, wherein said computer-executable instructions further cause one or more processors to perform the step of storing user settings or user preferences relating to a graphical user environment and/or to the mobile user applications on said transportable USB non-volatile solid-state memory device, and wherein said user settings or user preferences are movable across the multiple host computers when the transportable USB non-volatile solid-state memory device is moved between the multiple host computers.

54. The computer readable medium of claim 35, wherein said computer-executable instructions further cause one or more processors to perform the step of providing a security feature, said security feature comprising a password protection system including a password stored and transported on the transportable USB non-volatile solid-state memory device to restrict access to data stored on the transportable USB non-volatile solid-state memory device.

55. The computer readable medium of claim 35, wherein said transportable USB non-volatile solid-state memory device and the mobile user applications stored thereon are enabled on the host computer without the need for any external drivers and are instead enabled via a plug and play connection protocol.

56. The computer readable medium of claim 35, wherein said plurality of mobile user applications can be run on the host computer at the same time.

57. The computer readable medium of claim 35, wherein said computer-executable instructions further cause one or more processors to perform the step of modifying or updating said consistent user interface, whereby modified or updated user preferences or configuration data are stored and transported on the transportable USB non-volatile solid-state memory device.

58. The computer readable medium of claim 35, wherein said computer-executable instructions further cause one or more processors to perform the step of presenting the consistent user interface in a user selectable menu configuration.

59. The computer readable medium of claim 35, wherein the system management application is enabled without the need for a bootable operating system on the transportable USB non-volatile solid-state memory device.

60. The system of claim 35, wherein said host computer comprises a desktop or laptop personal computer, and wherein said transportable USB non-volatile solid-state memory device comprises a solid state memory in a self-contained housing with an integrated USB connector that physically attaches directly to a USB port of the host computer.

61. The system of claim 60, wherein said transportable USB non-volatile solid-state memory device has no standalone power source and is instead powered by the host computer to which it is coupled.

62. The computer readable medium of claim 35, wherein the mobile user applications are operable on the host computer without the need for a microprocessor on the transportable USB non-volatile solid-state memory device to execute instructions of the mobile user applications.

63. The computer readable medium of claim 62, wherein the system management application is configured to facilitate running the mobile user applications on a processor of the host computer and does not provide running of the mobile user applications on any processor that resides on the transportable USB non-volatile solid-state memory device.

64. The computer readable medium of claim 35, wherein said transportable USB non-volatile solid-state memory device does not include a processor configured to run the mobile user applications.

65. The computer readable medium of claim 35, wherein said transportable USB non-volatile solid-state memory device is a USB flash memory device.

66. The computer readable medium of claim 35, wherein the system management application is configured to facilitate running the mobile user applications on an operating system of the host computer and does not provide running of the mobile user applications on any operating system that resides on the transportable USB non-volatile solid-state memory device.

67. The computer readable medium of claim 35, wherein the mobile user applications are configurable for portable operation across multiple host computers by being accessible to one of the host computers directly from the transportable USB non-volatile solid-state memory device without the need for network connectivity by the host computer in order to access the mobile user applications.

68. The computer readable medium of claim 35, wherein said path name further comprises a drive nomenclature identifying the transportable USB non-volatile solid-state memory device.

69. The computer readable medium of claim 35, wherein the system management application ensures that any user files created during the temporary user session and remaining on the host computer at the end of the temporary user session are deleted.

70. The computer readable medium of claim 35, wherein the system management application further provides a standardized file system structure, wherein said standardized file system structure is configured to adapt to file system variables encountered when the transportable USB non-volatile solid-state memory device is moved between the multiple host computers by automatically remapping one or more paths to a file or folder located on the transportable USB non-volatile solid-state memory device.

71. A system for configuring multiple host computers to launch and run mobile software applications stored on a transportable USB mass storage memory device, comprising:
   a. a plurality of mobile user applications storable on the transportable USB mass storage memory device, said mobile user applications configurable for portable operation across multiple host computers such that the mobile user applications are operable when the transportable USB mass storage memory device is physically coupled to one of the multiple host computers; and
   b. a system management application storable on the same transportable USB mass storage memory device as the mobile user applications, said system management application configured to enable a temporary user session including execution of said mobile user applications on a host computer without permanent installation of said mobile user applications or a reboot being required when the transportable USB mass storage memory device is coupled to the host computer for the first time, wherein said mobile user applications are no longer available on said host computer when the transportable USB mass storage memory device is removed from the host computer, thus resulting in the temporary user session;
   c. wherein the system management application facilitates the configuration of the multiple host computers to run the mobile user applications by remapping file associations between program shortcuts or icons representative of the mobile user applications and the mobile user applications when the transportable USB mass storage memory device is decoupled from one of the multiple host computers and coupled to another one of the multiple host computers, wherein said program shortcuts or icons are configured to launch the mobile user applications upon selection by a user on the host computer and wherein the system management application is configured to present the program shortcuts or icons in a consistent user interface viewable across the multiple host computers based upon configuration data or user preferences stored and transported on the transportable USB mass storage memory device; and d. wherein the system management application further provides a standardized file system structure such that remapping of the file associations is carried out according to the standardized file system structure, whereby the program shortcuts or icons utilize a consistent path name to launch one or more program files associated with the mobile user applications across the multiple host computers, said consistent path name being stored and transported on the transportable USB mass storage memory device.

72. The system of claim 71, wherein said file associations comprise a path name to the mobile user applications.

73. The system of claim 72, wherein the system management application further provides a standardized file system structure, such that a consistent path name is utilized to access the user data files on said transportable USB mass storage memory device across the multiple host computers.

74. The system of claim 73, wherein said path name further comprises a drive nomenclature identifying the transportable USB mass storage memory device.

75. The system of claim 72, wherein said path name further comprises a drive nomenclature identifying the transportable USB mass storage memory device.

76. The system of claim 71, further comprising storing user data files on said transportable USB mass storage memory device, and wherein said user data files are movable across the multiple host computers.

77. The system of claim 76, wherein the system management application further provides a standardized file system structure based upon folder or directory structure information stored and transported on the transportable USB mass storage memory device, such that a consistent path name is utilized to access a given folder or directory on said transportable USB mass storage memory device across the multiple host computers.

78. The system of claim 71, wherein the system management application is configured to provide standardized access to the transportable USB mass storage memory device based upon configuration data or user preferences stored and transported on the transportable USB mass storage memory device, wherein said standardized access permits utilization of a consistent drive nomenclature or consistent device path name to access the transportable USB mass storage memory across the multiple host computers.

79. The system of claim 71, wherein said program shortcuts or icons comprise OLE links and/or OLE embedded objects loaded from the transportable USB mass storage memory device to the host computer.

80. The system of claim 79, wherein said OLE links or OLE embedded objects are dynamically updated or remapped on the new host computer when the transportable USB mass storage memory device is decoupled from one of the multiple host computers and coupled to another one of the multiple host computers.

81. The system of claim 71, wherein said file associations are dynamically updated or remapped when the transportable USB mass storage memory device is moved between the multiple host computers.

82. The system of claim 71, wherein said consistent user interface comprises a start menu on a Windows® based operating system.

83. The system of claim 71, wherein said system management application is configured to replace or update at least a portion of an operating system registry located on the host computer in order to enable execution of said mobile user applications on the host computer.

84. The system of claim 71, wherein said mobile user applications comprise common software applications including at least a word processing application and/or a spreadsheet application.

85. The system of claim 71, wherein said mobile user applications comprise common software applications including one or more of the following: (i) an e-mail client application; (ii) a web browser application; (iii) a game application; and (iv) an anti virus application.

86. The system of claim 71, wherein said system management application is further configured to adapt graphics display settings or data display settings on the host computer in order to compensate for different monitor characteristics encountered when the transportable USB mass storage memory device is moved between the multiple host computers, based upon user-preferred graphics display settings or data display settings stored and transported on the transportable USB mass storage memory device.

87. The system of claim 71, further comprising storing program settings relating to the mobile user applications on said transportable USB mass storage memory device, and wherein said program settings are movable across the multiple host computers and utilized by the system management application to configure the mobile user applications when executed on any of the multiple host computers to which the transportable USB mass storage memory device is currently physically coupled.

88. The system of claim 87, wherein said program settings relating to the mobile user applications comprise one or more of the following: (i) the path to the mobile user applications; (ii) website links; (iii) program configuration settings; and (iv) host computer configuration data.

89. The system of claim 71, further comprising storing user settings and/or user preferences relating to a graphical user environment or to the mobile user applications on said transportable USB mass storage memory device, and wherein said user settings or user preferences are movable across the multiple host computers when the transportable USB mass storage memory device is moved between the multiple host computers.

90. The system of claim 71, further comprising a security feature, said security feature comprising a password protection system including a password stored and transported on the transportable USB non-volatile solid-state memory device to restrict access to data stored on the transportable USB mass storage memory device.

91. The system of claim 71, wherein said transportable USB mass storage memory device and the mobile user applications stored thereon are enabled on the host computer without the need for any external drivers and are instead enabled via a plug and play connection protocol.

92. The system of claim 71, wherein said plurality of mobile user applications can be run on the host computer at the same time.

93. The system of claim 71, wherein said consistent user interface is modifiable or updateable, such that modified or updated user preferences or configuration data are stored and transported on the transportable USB mass storage memory device.

94. The system of claim 71, wherein said consistent user interface is presented in a user selectable menu configuration.

95. The system of claim 71, wherein the system management application is enabled without the need for a bootable operating system on the transportable USB mass storage memory device.

96. The system of claim 71, wherein the system management application is further configured so as to insure that changes made to the host computer are temporary.

97. The system of claim 71, wherein the transportable USB mass storage memory device is a transportable USB flash memory device.

98. The system of claim 97, wherein said host computer comprises a desktop or laptop personal computer, and wherein said transportable USB mass storage memory device comprises a solid state memory in a self-contained housing with an integrated USB connector that physically attaches directly to a USB port of the host computer.

99. The system of claim 98, wherein said transportable USB mass storage memory device has no standalone power source and is instead powered by the host computer to which it is coupled.

100. The system of claim 71, wherein the transportable USB mass storage memory device is a music jukebox device comprising data storage, music playback software, and a battery.

101. The system of claim 71, wherein the transportable USB mass storage memory device is a transportable USB hard drive device.

102. The method of claim 1, wherein said host computer comprises a desktop or laptop personal computer, and wherein said transportable USB non-volatile solid-state memory device comprises a solid state memory in a self-contained housing with an integrated USB connector that physically attaches directly to a USB port of the host computer.

103. The method of claim 102, wherein said transportable USB non-volatile solid-state_memory device has no standalone power source and is instead powered by the host computer to which it is coupled.

104. The system of claim 71, wherein the mobile user applications are operable on the host computer without the need for a microprocessor on the transportable USB mass storage memory device to execute instructions of the mobile user applications.

105. The system of claim 104, wherein the system management application is configured to facilitate running the mobile user applications on a processor of the host computer and does not provide running of the mobile user applications on any processor that resides on the transportable USB mass storage memory device.

106. The system of claim 71, wherein said transportable USB mass storage memory device does not include a processor configured to run the mobile user applications.

107. The system of claim 71, wherein the system management application is configured to facilitate running the mobile user applications on an operating system of the host computer and does not provide running of the mobile user applications on any operating system that resides on the transportable USB mass storage memory device.

108. The system of claim 71, wherein the mobile user applications are configurable for portable operation across multiple host computers by being accessible to one of the host computers directly from the transportable USB mass storage memory device without the need for network connectivity by the host computer in order to access the mobile user applications.

109. The system of claim 71, wherein said path name further comprises a drive nomenclature identifying the transportable USB mass storage memory device.

110. The system of claim 71, wherein the system management application ensures that any user files created during the temporary user session and remaining on the host computer at the end of the temporary user session are deleted.

111. The system of claim 71, wherein the system management application further provides a standardized file system structure, wherein said standardized file system structure is configured to adapt to file system variables encountered when the transportable USB mass storage memory device is moved between the multiple host computers by automatically remapping one or more paths to a file or folder located on the transportable USB mass storage memory device.

112. A method for configuring multiple host computers to launch and run mobile software applications stored on a portable USB non-volatile solid-state memory device, said method comprising:
 a. providing a plurality of mobile user applications on a transportable USB non-volatile solid-state memory device, said mobile user applications configurable for portable operation across multiple host computers such that the mobile user applications are operable when the transportable USB non-volatile solid-state memory device is physically coupled to one of the multiple host computers;
 b. providing a system management application on said transportable USB non-volatile solid-state memory device, said system management application configured to enable execution of said mobile user applications on a host computer without a reboot being required when the transportable USB non-volatile solid-state memory device is initially coupled to the host computer for the first time; and
 c. providing program shortcuts or icons representative of the mobile user applications viewable across the multiple host computers, said program shortcuts or icons configured to launch the mobile user applications upon selection by a user on the host computer, wherein the system management application is configured to present the program shortcuts or icons in a consistent user interface viewable across the multiple host computers;
 d. wherein the system management application facilitates the configuration of the multiple host computers to run the mobile user applications by remapping file associations between the program shortcuts or icons and the mobile user applications when the transportable USB non-volatile solid-state memory device is decoupled from one of the multiple host computers and coupled to another one of the multiple host computers;
 e. wherein the system management application further provides a standardized file system structure such that the remapping of file associations is carried out according to the standardized file system structure, whereby the program shortcuts or icons utilize a consistent drive nomenclature to launch one or more program files associated with the mobile user applications across the multiple host computers, said consistent drive nomenclature being stored and transported on the transportable USB non-volatile solid-state memory device; and
 f. wherein said mobile user applications comprise common software applications including one or more of the following: (1) an e-mail client application; (ii) a web browser application; (iii) a game application; and (iv) an anti virus application.

113. A computer readable medium having stored thereon computer-executable instructions for configuring multiple host computers to launch and run mobile software applications stored on a transportable USB non-volatile solid-state memory device, by causing one or more processors to perform the steps of:

a. storing a plurality of mobile user applications on a transportable USB non-volatile solid-state memory device, said mobile user applications configurable for portable operation across multiple host computers such that the mobile user applications are operable when the transportable USB non-volatile solid-state memory device is physically coupled to one of the multiple host computers;

b. storing a system management application on said transportable USB non-volatile solid-state memory device, said system management application configured to enable execution of said mobile user applications on a host computer without a reboot being required when the transportable USB non-volatile solid-state memory device is initially coupled to the host computer for the first time; and c. providing program shortcuts or icons representative of the mobile user applications viewable across the multiple host computers, said program shortcuts or icons configured to launch the mobile user applications upon selection by a user on the host computer, wherein the system management application is configured to present the program shortcuts or icons in a consistent user interface viewable across the multiple host computers;

d. wherein the system management application facilitates the configuration of the multiple host computers to run the mobile user applications by remapping file associations between the program shortcuts or icons and the mobile user applications when the transportable USB non-volatile solid-state memory device is decoupled from one of the multiple host computers and coupled to another one of the multiple host computers;

e. wherein the system management application further provides a standardized file system structure such that the remapping of file associations is carried out according to the standardized file system structure, whereby the program shortcuts or icons utilize a consistent drive nomenclature to launch one or more program files associated with the mobile user applications across the multiple host computers, said consistent drive nomenclature being stored and transported on the transportable USB non-volatile solid-state memory device; and f. wherein said mobile user applications comprise common software applications including one or more of the following: (1) an e-mail client application; (ii) a web browser application; (iii) a game application; and (iv) an anti virus application.

114. A system for configuring multiple host computers to launch and run mobile software applications stored on a transportable USB mass storage memory device, comprising:

a. a plurality of mobile user applications storable on the transportable USB mass storage memory device, said mobile user applications configurable for portable operation across multiple host computers such that the mobile user applications are operable when the transportable USB mass storage memory device is physically coupled to one of the multiple host computers; and b. a system management application storable on the same transportable USB mass storage memory device as the mobile user applications, said system management application configured to enable execution of said mobile user applications on a host computer without a reboot being required when the transportable USB mass storage memory device is coupled to the host computer for the first time;

c. wherein the system management application facilitates the configuration of the multiple host computers to run the mobile user applications by remapping file associations between program shortcuts or icons representative of the mobile user applications and the mobile user applications when the transportable USB mass storage memory device is decoupled from one of the multiple host computers and coupled to another one of the multiple host computers, wherein said program shortcuts or icons are configured to launch the mobile user applications upon selection by a user on the host computer and wherein the system management application is configured to present the program shortcuts or icons in a consistent user interface viewable across the multiple host computers;

d. wherein the system management application further provides a standardized file system structure such that remapping of the file associations is carried out according to the standardized file system structure, whereby the program shortcuts or icons utilize a consistent drive nomenclature to launch one or more program files associated with the mobile user applications across the multiple host computers, said consistent drive nomenclature being stored and transported on the transportable USB mass storage memory device; and e. wherein said mobile user applications comprise common software applications including one or more of the following: (i) an e-mail client application; (ii) a web browser application; (iii) a game application; and (iv) an anti virus application.

* * * * *